United States Patent
Haas et al.

(10) Patent No.: US 11,818,631 B2
(45) Date of Patent: Nov. 14, 2023

(54) COMMUNICATION DEVICE FOR DETECTING MESSAGES BASED ON SIGNAL STRENGTH

(71) Applicant: Transportation IP Holdings, LLC, Norwalk, CT (US)

(72) Inventors: Carl L. Haas, Walkersville, MD (US); Padam Dhoj Swar, Clarksburg, MD (US); Brian Kurz, Thurmont, MD (US); Richard S. Klemanski, Walkersville, MD (US); James Cowan, Pittsburgh, PA (US); Daniel McGee, Alexandria, VA (US)

(73) Assignee: Transportation IP Holdings, LLC

( * ) Notice: Subject to any disclaimer, the term of this patent is extended or adjusted under 35 U.S.C. 154(b) by 197 days.

(21) Appl. No.: 17/510,823

(22) Filed: Oct. 26, 2021

(65) Prior Publication Data
US 2023/0128650 A1    Apr. 27, 2023

(51) Int. Cl.
  *H04W 4/12* (2009.01)
  *H04B 17/318* (2015.01)
  *H04W 24/10* (2009.01)
  *H04W 24/08* (2009.01)

(52) U.S. Cl.
  CPC ............ *H04W 4/12* (2013.01); *H04B 17/318* (2015.01); *H04W 24/08* (2013.01); *H04W 24/10* (2013.01)

(58) Field of Classification Search
  CPC ....... H04W 4/12; H04W 24/08; H04W 24/10; H04B 17/318
  USPC ......................................................... 370/329
  See application file for complete search history.

(56) References Cited

U.S. PATENT DOCUMENTS

| | | | |
|---|---|---|---|
| 9,327,740 B2 * | 5/2016 | Murren | B61L 27/14 |
| 2006/0250967 A1 * | 11/2006 | Miller | H04L 43/50 370/352 |
| 2013/0083648 A1 * | 4/2013 | de Ruijter | H04L 1/0045 370/242 |
| 2013/0217358 A1 * | 8/2013 | Snider | H04W 12/122 455/411 |
| 2014/0315508 A1 * | 10/2014 | Ferchland | H04L 7/042 455/226.2 |
| 2022/0150004 A1 * | 5/2022 | Deixler | H04W 72/0453 |

FOREIGN PATENT DOCUMENTS

WO    WO-2014197122 A1 * 12/2014 ......... H04B 17/0062

* cited by examiner

*Primary Examiner* — Mong-Thuy T Tran
(74) *Attorney, Agent, or Firm* — THE SMALL PATENT LAW GROUP LLC; Philip S. Hof

(57) ABSTRACT

A communication device and method may include at least one tuner circuit that monitors at least a first frequency channel and a second frequency channel. A controller of the radio receiver may measure a first received signal strength indicator (RSSI) value over time for the first frequency channel and a second RSSI value over time for the second frequency channel. The first and second RSSI values are based on a signal strength of radio frequency (RF) energy received on the first and second frequency channels, respectively. The controller may detect a leader portion of a message on the first frequency channel responsive to a change in the first RSSI value exceeding a step change threshold. The controller may extract, via a detector circuit, message data from a carrier wave of the RF message.

20 Claims, 4 Drawing Sheets

COMMUNICATION DEVICE FOR DETECTING MESSAGES BASED ON SIGNAL STRENGTH

BACKGROUND

Technical Field

The subject matter described herein relates to vehicle communications.

Description of the Art

For certain vehicle systems that include numerous individual vehicles, or are exceptionally long, communication can be problematic. For example, communications from a first vehicle at the front of a vehicle system to a second vehicle at the rear of the vehicle system may be blocked or degraded by obstructions, particularly when the route on which the vehicle system travels is curved (e.g., non-linear). The obstructions may include tunnels, buildings, hills, and the like. In another example, some vehicle systems may include dozens or even hundreds of individual vehicles, such as railcars, and may stretch for distances up to or in excess of a mile. The sheer distance from a first vehicle at the front to a second vehicle at the rear may make communications between the first and second vehicles difficult and unreliable, even without obstructions along the communication pathway.

In a rail vehicle context, a head of train (HOT) communication device may be disposed on a locomotive at or near the front of a train, and an end of train (EOT) communication device may be mounted to a locomotive at or near the rear of the train. The EOT performs various functions for the train, including assisting with emergency brake applications. Thus, reliable communications between the HOT device and the EOT device are desired for safe functioning of the train.

Communication devices for inter-vehicular communications may be used on other types of vehicles as well, besides rail vehicles. For example, a fleet of automobiles may be employed as a taxi service in a downtown area, where communication between the automobiles is important for coordinating movements. However, downtown areas can include numerous large buildings that can obstruct the communication pathways between the individual vehicles. As a result confusion can occur, leading to double booking, a passenger not being picked up, or the like. Consequently, having reliable communication between vehicles of a vehicle system is desired.

BRIEF DESCRIPTION

In at least one embodiment, a communication device is provided that includes at least one tuner circuit, a detector circuit, and a controller including one or more processors. The at least one tuner circuit is configured to monitor at least a first frequency channel and a second frequency channel. The controller is configured to measure a first received signal strength indicator (RSSI) value over time associated with the first frequency channel. The first RSSI value is based on a signal strength of radio frequency (RF) energy received on the first frequency channel measured by the at least one tuner circuit. The controller is configured to measure a second RSSI value over time associated with the second frequency channel. The second RSSI value is based on a signal strength of the RF energy received on the second frequency channel measured by the at least one tuner circuit. The controller is configured to detect receipt of a leader portion of a message on the first frequency channel responsive to determining that a change in the first RSSI value exceeds a step change threshold within a designated period of time, and extract, via the detector circuit, message data from a carrier wave of the message.

In at least one embodiment, a method (e.g., for monitoring for incoming messages) is provided. The method includes monitoring, via a communication device, at least a first frequency channel and a second frequency channel. The method includes measuring a first received signal strength indicator (RSSI) value over time associated with the first frequency channel. The first RSSI value is based on a signal strength of radio frequency (RF) energy received on the first frequency channel. The method includes measuring a second RSSI value over time associated with the second frequency channel. The second RSSI value is based on a signal strength of RF energy received on the second frequency channel. The method includes detecting receipt of a leader portion of a message on the first frequency channel responsive to determining that a change in the first RSSI value exceeds a step change threshold within a designated period of time, and extracting message data from a carrier wave of the message.

In at least one embodiment, a communication device is provided that includes a tuner circuit, a detector circuit, and a controller that includes one or more processors. The tuner circuit is configured to independently monitor at least a first frequency channel and a second frequency channel. The controller is configured to control the tuner circuit to measure a signal strength of radio frequency (RF) energy received on the first frequency channel during first time intervals and a signal strength of RF energy received on the second frequency channel during second time intervals. The controller is configured to measure a first received signal strength indicator (RSSI) value over time representing the signal strength of the RF energy received on the first frequency channel, and to measure a second RSSI value over time representing the signal strength of the RF energy received on the second frequency channel. The controller is configured to select or modify a step change threshold for the first and second RSSI values based on a time of day, a time of year, a location of a vehicle on which the communication device is disposed, and/or an ambient signal level of the RF energy received on the first frequency channel and/or the second frequency channel. The controller is configured to detect receipt of a leader portion of a message on the first frequency channel by an antenna of the radio receiver responsive to determining that a change in the first RSSI value exceeds the step change threshold within a designated period of time, and to extract message data from a carrier wave of the message via the detector circuit.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
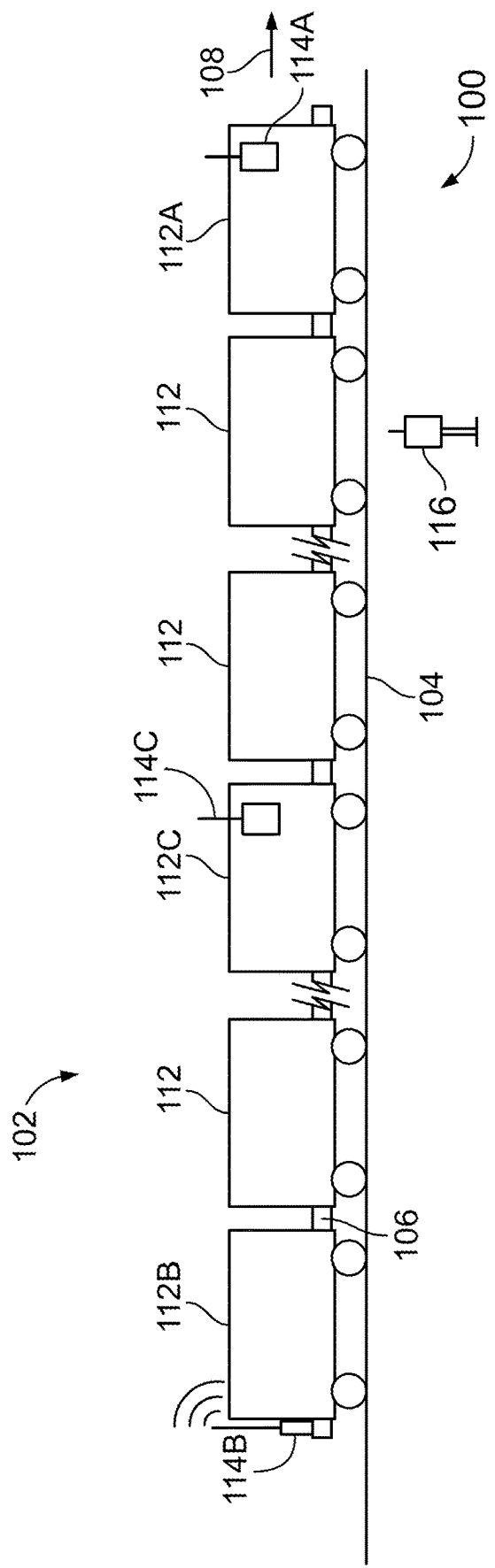
FIG. 1 illustrates a communication system that includes a vehicle system according to an embodiment.

Embodiments of the subject matter described herein relate to devices, systems, and methods for monitoring messages based on signal strengths of the messages received along one or more designated frequency channels or within one or more designated frequency ranges. As one example, the subject matter described herein may monitor received signal strength indicator (RSSI) values of received wireless signals at different times. RSSI is an analog output of some radio systems. Alternatively or additionally, one or more other indicators of signals strengths may be monitored (e.g., the decibel milliwatts of signals). The RSSI may represent a signal strength of RF energy received along a particular or designated frequency channel. An increase in the RSSI value along a frequency channel, within a designated period of time, may be an indication that an RF message is being sensed by an antenna of a communication device, while a decreasing RSSI value or RSSI value that remains below a designated threshold may indicate that no RF message is being sensed by the antenna on, within, or along the frequency channel. In an embodiment, a single communication device can monitor multiple different frequency channels by measuring and analyzing RSSI values for each of the different frequency channels. The communication device may perform channel-switching in which the communication device alternates between measuring the RSSI value for a first frequency channel and measuring the RSSI value for at least a second frequency channel during different time intervals. The channel switching may occur rapidly (e.g., at a relatively high frequency) to allow for detecting an incoming message during an early bit sync portion of the message, regardless of which frequency channel carries the message. The rapid channel switching and measuring of RSSI values can enable a single receiver circuit (e.g., a single tuner) of a device to effectively "listen" to two or more different channels for incoming messages. For example, the receiver circuit may pause on each channel just long enough to measure the signal activity on that channel, such that the receiver circuit monitors for activity indicative of a message rather than the message itself. Monitoring multiple designated frequency channels using a reduced amount of hardware and circuitry relative to known systems can increase efficiency and reduce costs.

In an embodiment, the communication device operates as a repeater for relaying messages between other devices (e.g., which may be onboard the same or different vehicles). A repeater is a device that monitors for a message and upon receiving a message, repeats the message. For example, an RF message may be broadcasted or transmitted from a from a sender device (e.g., the source of the message) on one vehicle to a receiver device (e.g., the intended recipient for the message) on another vehicle. The RF message may be a control or command signal that dictates a control setting or operation, a status signal that provides an information to the receiver device, a request for information from the receiver device, a confirmation indicating that a previous message was received, and/or the like. Without a repeater, the RF message may not successfully be received and/or interpreted by the receiver device due to signal degradation and energy loss along the communication pathway, interference from other signals, obstructions in the communication pathway, and/or the like. The repeater communication device may be located between the sender device and receiver device. Upon receiving an RF message, the repeater may repeat the communication of the message, such as by broadcasting an amplified version of the received message. The repeater effectively reduces the distance between two communicating devices, thus providing a stronger signal strength at a point closer to the receiver device. The repeater provides a relay that may improve the likelihood of successful message communication from the source to the final recipient, relative to attempting to wirelessly communicate directly from the source to the recipient.

The communication device disclosed herein may be able to operate as a repeater for multiple different communication pathways that utilize different frequency channels. For example, the communication device may monitor a first frequency channel for messages broadcasted along a first communication pathway, and may monitor a second frequency channel for messages broadcasted along a second communication pathway. Optionally, the first communication pathway may be used to send messages rearward along a length of a vehicle system that includes multiple vehicles (e.g., in a direction from a front of the vehicle system to a rear of the vehicle system), and the second communication pathway may be used to send messages forward along the length of the vehicle system. Alternatively, the first communication pathway may be used to send messages between a first and a second vehicle, and the second communication pathway may be used to send messages between the first vehicle and a third vehicle. The communication device disclosed herein may be used to monitor three or more frequency channels to detect messages communicated along at least three different communication pathways. By monitoring for RF messages communicated along different frequency channels, the communication device may be less costly to install and/or implement than alternative solutions, such as solutions that use multiple, redundant sets of hardware and/or software to perform similar operations. For example, the communication device and methods disclosed may avoid the need for two or more radio devices functioning as repeaters for simultaneously listening to different corresponding communication pathways and/or frequency channels.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy).

FIG. 1 illustrates a communication system 100 that includes a vehicle system 102 according to an embodiment. The vehicle system is land-based and travels on a route 104. The vehicle system includes multiple vehicles 112 mechanically coupled in a line to travel together along the route.

Adjacent vehicles are connected via couplers 106. One or more of the vehicles in the vehicle system are propulsion-generating vehicles capable of generating tractive effort for propelling the vehicle system along the route. The propulsion-generating vehicles include a propulsion system, such as an engine, one or more traction motors, and/or the like. One or more of the vehicles may be non-propulsion-generating vehicles that do not generate tractive effort, and are pushed and/or pulled by the one or more propulsion-generating vehicles. The vehicle system optionally may be longer and include more vehicles than the six vehicles illustrated in FIG. 1, or alternatively may include as few as one vehicle. In an alternative embodiment, at least some of the vehicles of the vehicle system are mechanically separate (e.g., spaced apart without any linkage or coupler tethering the vehicles together). For example, mechanically separate propulsion-generating vehicles may be communicatively connected to each other to travel with coordinated movements along the route based on wireless control signals (e.g., to travel as a convoy).

In an example, the vehicle system can be a railroad train, and the route is a track. In other examples, the vehicle system may be a road train formed by multiple trucks (e.g., highway semi-truck, mining truck, logging truck, or the like), trailers, automobiles, buses, and/or the like. The route may be a paved road, an off-road path, or the like. In still other examples, marine vessels, aircraft (e.g., unmanned aerial vehicles), and/or the like may represent the vehicle system.

The communication system includes multiple controller assemblies that communicate with one another. The controller assemblies may be one or more onboard controller assemblies disposed onboard the vehicle system and/or one or more wayside controller assemblies. In one example embodiment, the vehicle controller assemblies may provide wireless communications between the vehicles and/or remote locations, including wayside devices, remote dispatch facilities, stations, and the like. The controller assemblies may include a receiver and a transmitter, or a transceiver that performs both receiving and transmitting functions. The controller assemblies may also include an antenna and associated circuitry. One or more of the controller assemblies may be portable devices that are removably mounted to a vehicle, wayside equipment and/or infrastructure, and/or the like. In the illustrated embodiment, the communication system includes a first onboard controller assembly 114A disposed on a lead or front vehicle 112A of the vehicle system according to a planned direction of travel 108 of the vehicle for a trip. In an example, the first onboard controller assembly may be a head-of-train (HOT) vehicle controller. The HOT vehicle controller may be in communication with numerous operating systems of the vehicle system including an engine, traction motors, throttle, bearing systems, braking system, and/or the like. The HOT vehicle controller may be mounted on a propulsion-generating vehicle, such as a locomotive in a rail application, and hardwired to control circuitry of the propulsion-generating vehicle.

The communication system also includes a second onboard controller assembly 114B disposed on a rear or end vehicle 112B of the vehicle system that is at the opposite end relative to the lead vehicle. In an example, the second onboard controller assembly may be an end-of-train (EOT) controller assembly. The EOT controller assembly may be coupled to and operate an emergency braking system of the vehicle system. The EOT controller assembly may be mounted to a propulsion-generating vehicle or a non-propulsion-generating vehicle. The EOT controller assembly may communicate with one or more of the other controller assemblies for integrity checks, status updates, emergency braking commands, and the like. For example, the EOT controller assembly may communicate with the HOT controller assembly. An integrity check may include information that confirms that the rear end of the vehicle system is intact and properly operating, even if the rear end is not visible to an operator or a camera located at the lead vehicle. Although the HOT controller assembly is onboard the lead vehicle of the vehicle system and the EOT controller assembly is onboard the rear vehicle of the vehicle system in FIG. 1, the HOT and/or EOT controller assembly may be located on another vehicle that is between the lead and rear vehicles in other embodiments. In other example embodiments, the first controller assembly and/or the second controller assembly may be neither a HOT nor EOT controller assembly, but rather a vehicle controller that is an integrated component of a vehicle, such as a locomotive.

The communication system may include a third onboard controller assembly 114C located on an intermediate vehicle 112C along a middle region of the vehicle system. The intermediate vehicle is disposed between the lead vehicle and the rear vehicle in the line of vehicles that form the vehicle system. The third onboard controller assembly may be a portable device or a vehicle controller that is an integrated component of the intermediate vehicle. Optionally, the third onboard controller assembly may be a HOT controller assembly or an EOT controller assembly. In one example, the third onboard controller assembly is a HOT controller assembly, such that the vehicle system includes HOT controller assemblies disposed on the lead vehicle and the intermediate vehicle, and an EOT controller assembly disposed on the rear vehicle. The vehicle system may include more or less than the three controller assemblies shown in FIG. 1.

In an embodiment, the third onboard controller assembly disposed on the intermediate vehicle may operate as a repeater device. The third onboard controller assembly may repeat RF messages communicated between vehicles of the vehicle system. For example, the third onboard controller assembly may monitor a first frequency channel for repeating messages communicated from the HOT controller assembly at the lead vehicle to the EOT controller assembly at the rear vehicle. The third onboard controller assembly may also monitor a second frequency channel for repeating messages communication from the EOT controller assembly to the HOT controller assembly.

In yet other example embodiment, a vehicle system such as a fleet of ships, a fleet of automobiles, a fleet of aircraft, a fleet of mining vehicles, etc. may be presented that do not have HOT or EOT controller assemblies. Instead, each individual vehicle in the vehicle system may have its own vehicle controller that is part of the communication system.

The communication system may also include a wayside controller assembly 116 that may receive and repeat RF messages when the vehicle system is in the vicinity of the wayside controller assembly. In particular, when the wayside controller assembly is between a sender communication device and a receiver communication device, the wayside controller assembly may be part of the communication system. The wayside controller assembly may be any device that is not located on the vehicle system and includes functionality to receive and generate RF messages (e.g., signals). The wayside controller assembly may include or be coupled to a crossing device, battery recharging device, an imaging device (e.g., camera), a traffic signal device, a dispatch device, a maintenance controller device, or the like. The wayside controller assembly may communicate within the communication system to receive and repeat messages.

In an embodiment, the communication system may include a sender communication device that broadcasts an RF message intended for a receiver communication device. The RF message may be a control or command signal, a request for information, a status signal that provides information (e.g., identification information, sensor data, etc.), a confirmation or acknowledgement of a received message, and/or the like. Optionally, the first onboard controller assembly may be the sender communication device for communication of a first message, and the second onboard controller assembly may be the receiver communication device. The third onboard controller assembly and/or the wayside controller assembly, when disposed closer to the second onboard controller assembly than the proximity of the first onboard controller assembly to the second onboard controller assembly, can be repeaters that receive and repeat the first message. Optionally, the third onboard controller assembly and/or the wayside controller assembly may each function as a repeater for messages communicated on multiple different frequency channels, as described herein.

One or more processors of the third onboard controller assembly and/or the wayside controller assembly can execute program instructions to monitor RSSI values for each of multiple frequency channels during a common monitoring time period, and detect an incoming message along a first frequency channel based on a change in the RSSI value for the first frequency channel. The third onboard controller assembly and/or the wayside controller assembly may then repeat the receive message on the first frequency channel, and switch to monitor for messages (e.g., RF signals) along a second frequency channel. Repeating the first message by the third onboard controller assembly and/or the wayside controller assembly improves overall communication quality by increasing the likelihood that the first message is successfully received and correctly interpreted by the intended receiver device, relative to relying on direct communication between the sender device and the receiver device. Optionally, the second frequency channel may be utilized by the second onboard controller assembly (e.g., the EOT controller assembly) to communicate messages to the first onboard controller assembly (e.g., the HOT controller assembly). Optionally, the communication system may include more than the four controller assemblies shown in FIG. 1. In another example, the communication system may only include a single repeater device disposed between the sender and receiver communication devices.

Figure 2:
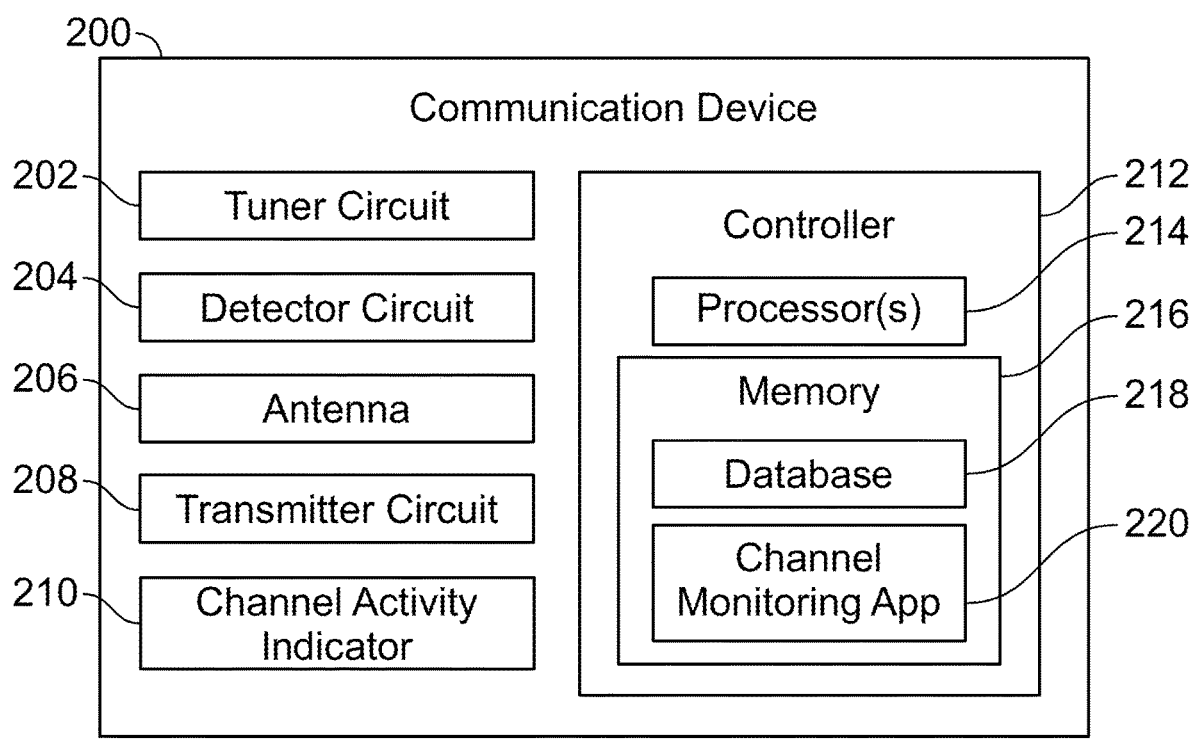
FIG. 2 is a schematic block diagram of a communication device for monitoring RF messages based on received signal strength indicator (RSSI) values over time according to an embodiment.

FIG. 2 is a schematic block diagram of a communication device 200 for monitoring RF messages based on received signal strength indicator (RSSI) values over time according to an embodiment. The controller device may be capable of operating as a repeater device to communicate the content of RF messages that the controller device receives. The communication device may be disposed onboard a vehicle. For example, the communication device may be a component of one of the onboard controller assemblies in FIG. 1. In one embodiment, the communication device is a component of a HOT controller assembly. The HOT controller assembly that includes the communication device may be disposed onboard an intermediate vehicle along a middle region of a vehicle system, such as the third onboard controller assembly in FIG. 1. In an alternative embodiment, the communication device may be offboard a vehicle. Optionally, the communication device may be a component of the wayside controller assembly in FIG. 1.

The communication device in the illustrated embodiment has a tuner circuit 202, a detector circuit 204, an antenna 206, a transmitter circuit 208, a channel activity indicator 210, and a controller 212. Optionally, all of the components of the communication device may be held within or attached to a housing. The controller is operably coupled to one or more of the other components of the communication device via wired and/or wireless communication pathways. By "operably coupled," it is meant that two or more devices, systems, subsystems, assemblies, modules, components, and the like, are joined by one or more wired or wireless communication links, such as by one or more conductive (e.g., copper) wires, cables, or buses; wireless networks; fiber optic cables; or the like. The controller may be a control circuit.

The controller may perform at least some of the operations described herein to monitor multiple frequency channels to detect incoming RF messages. The controller represents hardware circuitry that includes and/or is connected with one or more processors 214 (e.g., one or more microprocessors, integrated circuits, microcontrollers, field programmable gate arrays, etc.). The controller includes and/or is connected with a tangible and non-transitory computer-readable storage medium (e.g., memory) 216. The memory may store programmed instructions (e.g., software) that is executed by the one or more processors to perform the operations of the controller described herein. The memory may store additional information, such as an RSSI step change database 218, a channel monitoring application 220, a calendar, a map or route database, and/or the like.

The RSSI step change database may associate various step change thresholds with different corresponding conditions. The step change threshold is used to detect an incoming RF message. For example, the step change threshold represents a lower limit of a change in the RSSI value along a given frequency channel that indicates that a message is being received. In an embodiment, the controller uses dynamic RSSI to detect incoming messages, rather than a static, fixed threshold RSSI value. The dynamic RSSI monitors changes in the RSSI value within a designated period of time, and compares a (maximum) change in the RSSI value within the designated period to the step change threshold. If the change in the RSSI value exceeds the step change threshold, then the controller determines that an RF message is being received. Conversely, changes in RSSI value that do not reach or exceed the step change threshold are dismissed as not being indicative of a received RF message, but rather may be due to noise, interference, and/or the like.

Optionally, the RSSI step change database may include different step change thresholds for different conditions. One of the conditions may be location of a vehicle on which the communication device is disposed. The location of the vehicle may be determined via a location determining device disposed onboard the vehicle. An example location determining device is a GPS receiver. Another condition may be an ambient signal level of received RF energy on the respective frequency channel. The ambient signal level may represent a metric calculated based on the received signal strength (e.g., the RSSI value) over time. For example, the ambient signal level may represent the average or the median of the RSSI value over a set duration of time, factoring all RF energy received. Other conditions may include time of day and/or time of year. In an embodiment, the controller determines one or more relevant conditions and then accesses the step change database to select which step change threshold to apply based on the one or more conditions that are input.

The channel monitoring application may provide instructions for the controller to monitor multiple different frequency channels. The channel monitoring application may identify the frequency channels to monitor, may provide settings for switching the tuner circuit between different frequency channels, and/or may include instructions for responsive actions depending on whether or not an RF message is received.

The tuner circuit of the communication device may be used to monitor at least a first frequency channel and a second frequency channel. The tuner circuit may filter and extract signals of a particular frequency from a mix of signals with multiple different frequencies. For example, the antenna of the communication device may capture radio waves of all frequencies. The radio waves may be sent to an amplifier of the communication device that amplifies the radio waves. The tuner circuit then filters the radio waves to extract the signal that has the particular frequency channel (or narrow band) of interest. The tuner circuit may include an inductor (e.g., a coil) and a capacitor to form a resonating circuit that has a particular resonant frequency based on values chosen for the inductor and the capacitor. This resonating circuit may function as a bandstop filter that blocks alternating current (AC) signals above and below the resonant frequency. The tuner circuit may adjust the resonant frequency, and therefore, the frequency channel of interest, by varying the amount of inductance in the coil and/or the capacitance of the capacitor. For example, the inductance in the coil can be modified by varying the number of turns of wire in the coil. In an embodiment, the single tuner circuit is controlled by the controller to switch between monitoring at least two different frequency channels.

The tuner circuit may measure a signal strength of received RF energy on each of the monitored frequency channels over time. For example, upon switching to monitor a first frequency channel, the tuner circuit may measure the signal strength of RF energy received by the tuner circuit along the first frequency channel over time. In response to switching to monitor a different, second frequency channel, the tuner circuit may measure the signal strength of RF energy received along the second frequency channel over time. The received signal strength of RF energy is plotted as an RSSI value over time.

The detector circuit may extract message data from a carrier wave of the message that is received along one of the monitored frequency channels. For amplitude-modified (AM) signals, the detector circuit may include a diode that rectifies the AC signal to a direct current (DC) signal. The message data may include control instructions or demands, a status update or other information, a request for information or assistance, a confirmation that a previous message was received, and/or the like.

The transmitter circuit may be used to generate outgoing messages. For example, the transmitter circuit may generate and communication a repeat message that includes the message data extracted from the carrier wave of the message. The transmitter circuit may include a power supply, an oscillator, a modulator (e.g., modem), and an amplifier. The oscillator may be powered by the power supply to generate a carrier wave at a designated frequency channel. The power supply may be a battery, an external power circuit connected via plug and cable, or the like. The modulator may add message data (e.g., information) to the carrier wave. The modulator may add the message data by modulating the frequency or the amplitude of the carrier wave. The amplifier of the transmitter circuit may amplify the modulated carrier wave to increase the broadcast power of the modulated carrier wave. The antenna of the communication device is used to convert the amplified electrical signal to radio waves and emit the radio waves.

Optionally, the communication device may include separate receiver and transmitter components. Alternatively, the communication device may include a transceiver that shares one or more components used in receiver operations, such as components of the tuner circuit and/or the detector circuit, with one or more components used in transmitter operations.

The channel activity indicator of the communication device may be a digital output. The channel activity indicator may be used to notify an operator that an incoming message is being received on a selected frequency channel. For example, in response to detecting receipt of a message, the controller may actuate the channel activity indicator to notify the operator. The indicator may include a light, such as an LED. Alternatively, or in addition, the indicator may include an audio output, such as a speaker or buzzer, that generates a sound and/or a mechanical output that vibrates to notify the operator. As described herein, the controller may detect the receipt of the message based on dynamic RSSI, such that a change in the RSSI value exceeds a step change threshold. As such, the controller may actuate the channel activity indicator in response to detecting that the change in RSSI value exceeds the step change threshold. Alternatively, the controller may operate the channel activity indicator in response to detecting that the RSSI value of the selected frequency channel exceeds a fixed threshold value.

Figure 3:
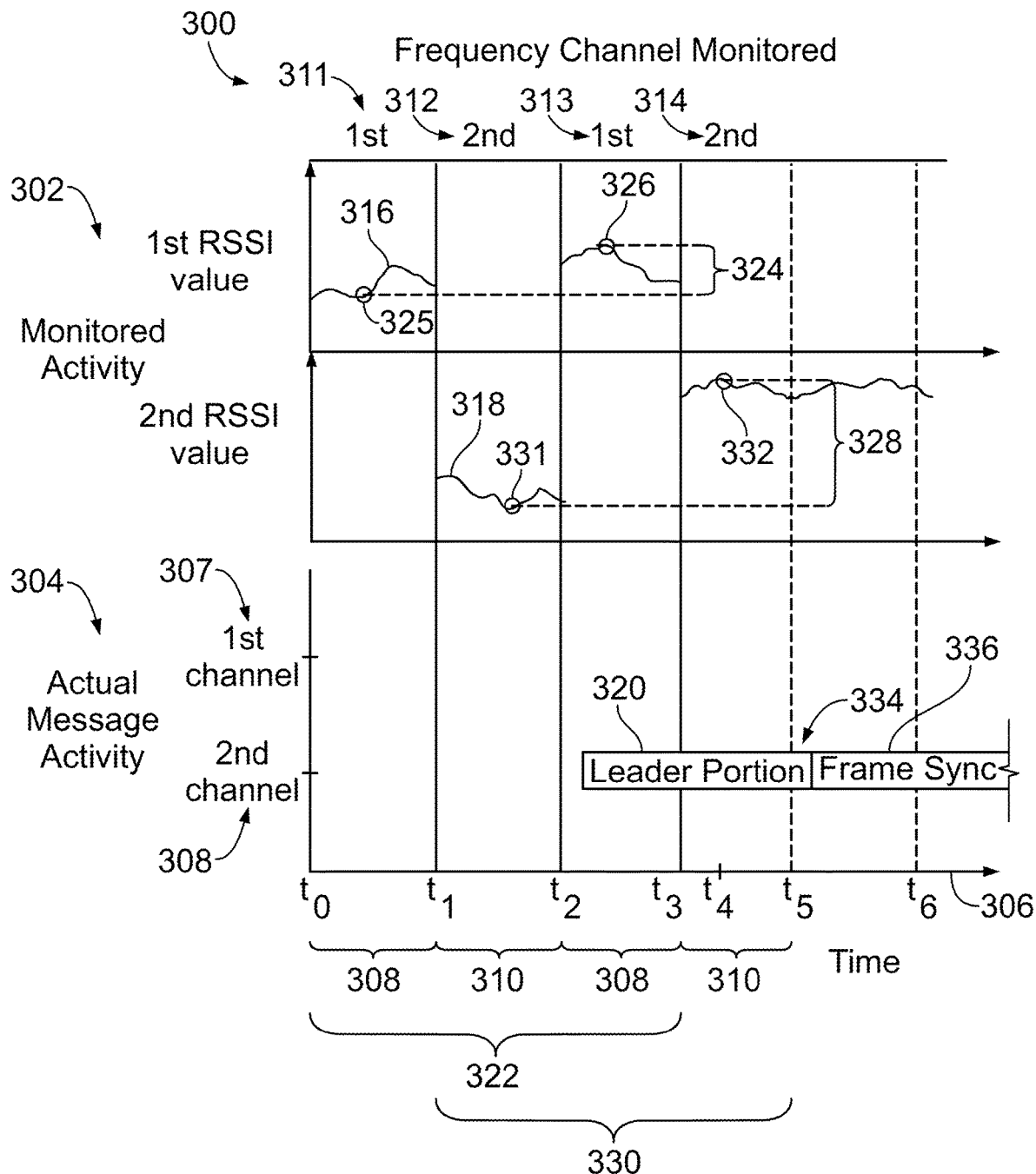
FIG. 3 is a graph that depicts RSSI values monitored by a communication device along two frequency channels and actual message activity on the two frequency channels according to an embodiment.

FIG. 3 is a graph 300 that depicts RSSI values monitored by a communication device along two frequency channels and actual message activity on the two frequency channels over time according to an embodiment. The RSSI values in the graph may be monitored by the communication device of FIG. 2. The graph shows both monitored activity 302 and actual message activity 304 over a common time scale, depicted as the horizontal axis 306. The monitored activity refers to RSSI values monitored by the tuner circuit and/or the controller of the communication device. The actual message activity indicates when and along which frequency channel a message is actually received, according to a hypothetical example. The communication device uses the monitored activity to determine the actual message activity, because otherwise the actual message activity is unknown to the communication device.

In an embodiment, the tuner circuit may include a single tuner circuit that measures the signal strength of the received RF energy on a first frequency channel 307 during first periodic time intervals 308, and measures the signal strength of the received RF energy on a second frequency channel 309 during second periodic time intervals 310. The monitored activity section of the graph shows that the first frequency channel is monitored during the first and third intervals 311, 313 depicted in the graph, and the second frequency channel is monitored during the second and fourth intervals 312, 314 in the graph. In the illustrated embodiment, the first periodic time intervals alternate with the second periodic time intervals such that the tuner circuit is controlled to switch back and forth between monitoring the first frequency channel and the second frequency channel. For example, the graph shows that from time $t_0$ to $t_1$, the tuner circuit monitors the first frequency channel without monitoring the second frequency channel.

The tuner circuit may monitor the first frequency channel by measuring the signal strength of received RF energy on the first frequency channel, the signal strength over time is output as a first RSSI value 316 over time. As shown in FIG.

3, the first RSSI value modulates from time $t_0$ to $t_1$. Because the tuner circuit is not monitoring the second frequency channel during this time period, there is no line indicating the second RSSI value from time $t_0$ to $t_1$. At time $t_1$, the tuner circuit switches to monitor the second frequency channel for the next time interval until time $t_2$. A line indicating the second RSSI value 318 is shown in the second time interval. The tuner circuit may not monitor the first frequency channel while monitoring the second frequency channel, so the first RSSI value drops to zero or disappears. Optionally, the first periodic time intervals may be approximately the same duration as the second periodic time intervals to devote equal time to monitoring for messages along each frequency channel. The duration of the periodic time intervals may be selected with reference to the duration of a leader portion 320 of a received message to ensure that the tuner circuit switches at a sufficient frequency to detect the leader portion, as described herein.

At time $t_2$, the tuner circuit switches back to monitoring the first frequency channel during this third interval until time $t_3$. The controller of the communication device may monitor the first frequency channel by measuring a change 324 in the first RSSI value within a designated period of time or window 322. The designated period of time in the illustrated embodiment encompasses approximately two successive first periodic time intervals in which the first frequency channel is monitored, and includes the intervening second periodic time interval during which the second frequency channel is monitored. The controller may measure the change by determining the lowest or minimum first RSSI value 325 within the designated period of time, determining the highest or maximum first RSSI value 326 within the same designated period of time, and subtracting the two values to calculate the difference or change. For example, during the interval from time $t_2$ to time $t_3$, the controller may measure the change in the first RSSI value and compare the change to a step change threshold. The selection of the step change threshold is described herein in more detail. In this hypothetical example, the illustrated change in the first RSSI value is not greater than the step change threshold. As a result, the controller does not detect receipt of an incoming message along the first frequency channel.

At time $t_3$, the controller controls the tuner circuit to monitor the second frequency channel again. As with the first frequency channel, the controller monitors the second RSSI value over time by measuring a change 328 in the second RSSI value within a designated period of time or window 330. The designated period of time in the illustrated embodiment encompasses approximately two successive second periodic time intervals in which the second frequency channel is monitored, and includes the intervening first periodic time interval during which the first frequency channel is monitored. The controller may measure the change by determining the lowest or minimum second RSSI value 331 within the designated period of time, determining the highest or maximum second RSSI value 332 within the same designated period of time, and subtracting the two values to calculate the difference or change. For example, during the interval from time $t_3$ to time $t_5$, the controller may measure the change in the second RSSI value and compare the change to a step change threshold. In this hypothetical example, the illustrated change in the second RSSI value exceeds the step change threshold. As a result, the controller detects receipt of an incoming message 334 along the second frequency channel.

Optionally, the controller may continually calculate the maximum change in the RSSI value within the current designated time period, so the controller may detect that the change exceeds the step change threshold at or shortly after time $t_4$, which is the time that the maximum second RSSI value is measured. Thus, the controller may detect the incoming message prior to the end of the interval.

The actual message activity indicates that the incoming message communicated along the second frequency channel arrived at the communication device during the first periodic time interval between times $t_2$ and $t_3$, while the tuner circuit was monitoring the first frequency channel. The controller detected the incoming message shortly after the tuner circuit switched back to monitoring the second frequency channel at time $t_3$.

The message may include multiple different segments. The segment of the message may include the leader portion, a frame sync portion 336, a main body portion, and the like. The leader portion may be a fairly long bit sync pattern at the beginning of the transmission package. The durations of the first and second periodic time intervals during which the different RSSI values are monitored may be selected based on the duration of the leader portion. For example, the respective durations of the first and second periodic time intervals may be shorter than the duration at which the leader portion is received by the antenna of the communication device. As shown in FIG. 3, the tuner circuit would have switched twice during the amount of time that the leader portion is received, but for the detection of the leader portion. In an example, the duration of the leader portion may be around 50 ms, and each periodic time interval may be around 10 ms. In an alternative embodiment in which the tuner circuit is used to monitor three different frequency channels, one at a time, the period time intervals may be selected such that the leader portion is longer than two periodic time intervals. For example, if the message is received along a third frequency channel while the tuner circuit is monitoring a first frequency channel, the tuner circuit will switch to the second frequency channel and then to the third frequency channel prior to the end of the leader portion reaching the communication device.

The frame sync portion may be the next part of the incoming message after the leader portion. The frame sync portion may be used by the controller to lock on to the incoming message. In an embodiment, in response to detecting the incoming message, the controller suspends the channel-switching operation. For example, at the end of the periodic time interval at time t5, the controller does not switch the tuner circuit to monitor the first frequency channel again. Rather, the controller maintains the tuner circuit continuously monitoring the second frequency channel. The detector circuit may extract message data from the carrier wave of the message. The controller may attempt to identify a frame synchronization pattern that is within the frame sync portion of the message. The frame synchronization pattern provides necessary information for interpreting the message, such as byte boundaries.

In FIG. 6, the controller continues to monitor the second frequency channel beyond time $t_5$, and even beyond time $t_6$, without switching to monitor the first frequency channel. The controller may control the tuner circuit to switch back to monitoring the first frequency channel in response to a triggering event. The triggering event may be a determination that the remainder of the message has been received. The controller may determine that the end of the message is received based on data content and/or a recognized pattern in the message indicating the end of the message, a drop in the monitored second RSSI value beyond a designated drop threshold, or the like. For example, the drop threshold may be the same or similar to the step change threshold. The drop in the second RSSI value indicates the lack of activity along the second frequency channel. Another triggering event may be that a designated timeout period expired. The timeout period may begin at the time that the incoming message is detected. If the controller is not able to detect the frame synchronization pattern in the message within the timeout period, then the controller may determine that the incoming message may have been a false detection, such that there was no message. Even if there was a message, but the message was too degraded for the controller to interpret, the timeout period may apply to ensure that the controller does not miss any messages along other frequency channels while listening exclusively to one frequency channel. In an embodiment, after the triggering event, the controller may control the tuner circuit to monitor the first frequency channel, and the process may continue similar to the beginning of FIG. 3 at time $t_0$.

When the controller successfully detects the frame synchronization pattern, the frame synchronization pattern is used by the controller to interpret the body portion of the message. For example, the detector circuit may extract message data from the carrier wave of the message, and the controller may use the frame synchronization pattern to assembly and interpret the message data.

In an embodiment, the communication device may be operated as a repeater. In response to extracting the message data, the controller may control the transmitter circuit of the communication device to generate and communicate a repeat message that includes the message data. For example, if the message data includes a control signal, the repeat message is generated to include the control signal. The controller may control the transmitter circuit to communicate the repeat message on the first frequency channel or the second frequency channel. The controller may determine which frequency channel on which to communicate the repeat message based on (i) an intended recipient of the repeat message and/or (ii) a direction of communication of the repeat message along a length of the vehicle system. For example, the first frequency channel may be used to communicate messages between vehicles of a vehicle system in a rearward direction along the length of the vehicle system. The second frequency channel may be used to communicate messages between the vehicles in a forward direction along the length of the vehicle system. In the illustrated embodiment in FIG. 3, the message is received along the second frequency channel. The message may be intended for transmission in the forward direction towards the lead vehicle. The communication device may communicate the repeat message along the second frequency channel as well for receipt by the lead vehicle.

Although FIG. 6 shows receipt of an incoming message along the second frequency channel, the controller performs similar operations for messages received along the first frequency channel. Optionally, the same tuner circuit can be used to monitor three or more frequency channels by switching between the channels one at a time in a repeating sequence. For example, the tuner circuit may monitor a first frequency channel during a first time interval, may monitor a second frequency channel during a second time interval, may monitor a third frequency channel during a third time interval, and then may repeat such that the first frequency channel is monitored again during a fourth time interval.

In one embodiment, the communication device utilizes dynamic RSSI to detect the incoming message, rather than a pre-determined RSSI threshold value. Pre-determining an RSSI threshold value may apply sufficiently well for some conditions and may not be sufficient in other conditions. For example, urban and/or industrial environments may have a greater ambient signal level (or noise level) than a rural environment due to the presence of more RF emitting devices and more interference. For this reason, using an RSSI threshold value that would work well in an urban environment may fail to detect otherwise valid messages in rural environments where there is a lower ambient signal level. The communication device may be exposed to various different conditions when in use. For example, the communication device may be exposed to different temperatures and weather conditions. The communication device may be disposed onboard a vehicle system, such as the vehicle system in FIG. 1, so the communication device may experience different locations and environments. Due to the various conditions and the effect that the conditions may have on the ambient signal level, the controller according to an embodiment uses dynamic RSSI which analyzes the change in RSSI value over time, rather than comparing the RSSI value at a certain time to a fixed threshold value. The dynamic RSSI may reduce or avoid the issues associated with the changing noise floor in different conditions.

In a first embodiment, the step change threshold is a fixed value. For example, the step change threshold may be a fixed step change, such as an increase of 15 dB, 20 dB, 25 dB, or 30 dB. The controller measures the change in the RSSI value associated with a monitored frequency channel within a designated period of time (e.g., by subtracting the minimum RSSI value in the designated period of time from the maximum RSSI value in the designated period of time). The controller also may confirm that the change is positive, such that the maximum RSSI value in the designated period of time occurs subsequent to the minimum RSSI value. The controller then compares the measured change (e.g., positive increase) in the RSSI value to the fixed step change threshold. If the measured change exceeds the step change threshold, then the controller detects the presence of an incoming message along the monitored frequency channel.

In a second embodiment, the step change threshold is dynamic and/or variable, and the controller selects and/or modifies the step change threshold based on one or more conditions. In an example, one condition may be a location of a vehicle on which the communication device is disposed. As described above, due to inherent variation in ambient signal level, the controller may select a greater step change threshold in an urban area and/or an industrial area, and may select a lower step change threshold in a rural area. The different areas may be delineated by county and/or city borders, such that a certain town may be classified as rural and another town may be classified as urban or industrial. Alternatively, the different areas may be delineated using zoning or the like.

According to an embodiment, the controller of the communication device may monitor the location of the vehicle. A current location of the vehicle, as determined via a GPS receiver onboard the vehicle, may be conveyed to the communication device. The controller may compare the current location, over time, to a map or map coordinates. In response to the controller determining that the vehicle has crossed a geofence while traveling on a route for a trip, the controller may automatically adjust the step change threshold according to the new location or area of the vehicle. As such, the controller may adjust the step change threshold from a first step change threshold to a second step change threshold while the vehicle travels based on the location of the vehicle. The first step change threshold may be associated with a rural area, the second step change threshold may be associated with an urban area, and the controller may adjust the step change threshold, in real-time on the fly, in response to determining that the vehicle has crossed a geofence from the rural area to the urban area. As such, due to the modified step change threshold, a change in RSSI value of a first magnitude may trigger detection of an incoming message if received while the vehicle is traveling in a first area, and may not trigger detection of an incoming message if received while the vehicle is in a different, second area.

Yet another condition that may be used for selecting and/or modifying the step change threshold may include the ambient signal level, or background noise, in the measured RF energy along the respective frequency channels. In general, if there is significant background noise, the step change threshold may be selected to be greater than if there is limited background noise. The controller may monitor the ambient signal level over time to determine a baseline value within a relevant time window, and then may select the step change threshold based on the baseline value. For example, the controller may select the step change threshold to be greater in a first area than a second area because the ambient signal level within the first area is greater than the ambient signal level within the second area.

Other conditions that may be used for selecting and/or modifying the step change threshold may include time of day, a time of year, a weather condition, and the like. For example, the ambient signal level, or background noise, may be lower at night than at day time. The step change threshold used at night may be lower than the step change threshold used during the day. In another example, communications may be degraded by some types of weather, such as thunderstorms. In degraded conditions, the step change threshold may be different than the step change threshold selected in non-degraded conditions.

In an embodiment, pre-determined relationships between various conditions and associated step change thresholds may be recorded in the database that is stored in a memory device, such as the memory of the communication device in FIG. 2. The controller may select the step change threshold by accessing the database and using, as an input, at least one relevant condition. For example, the controller may look up in the database a step change threshold that is associated with travel of the vehicle system through a designated geographic area during the daytime. The relationships may be determined based on observations, experimental data, and/or the like.

Figure 4:
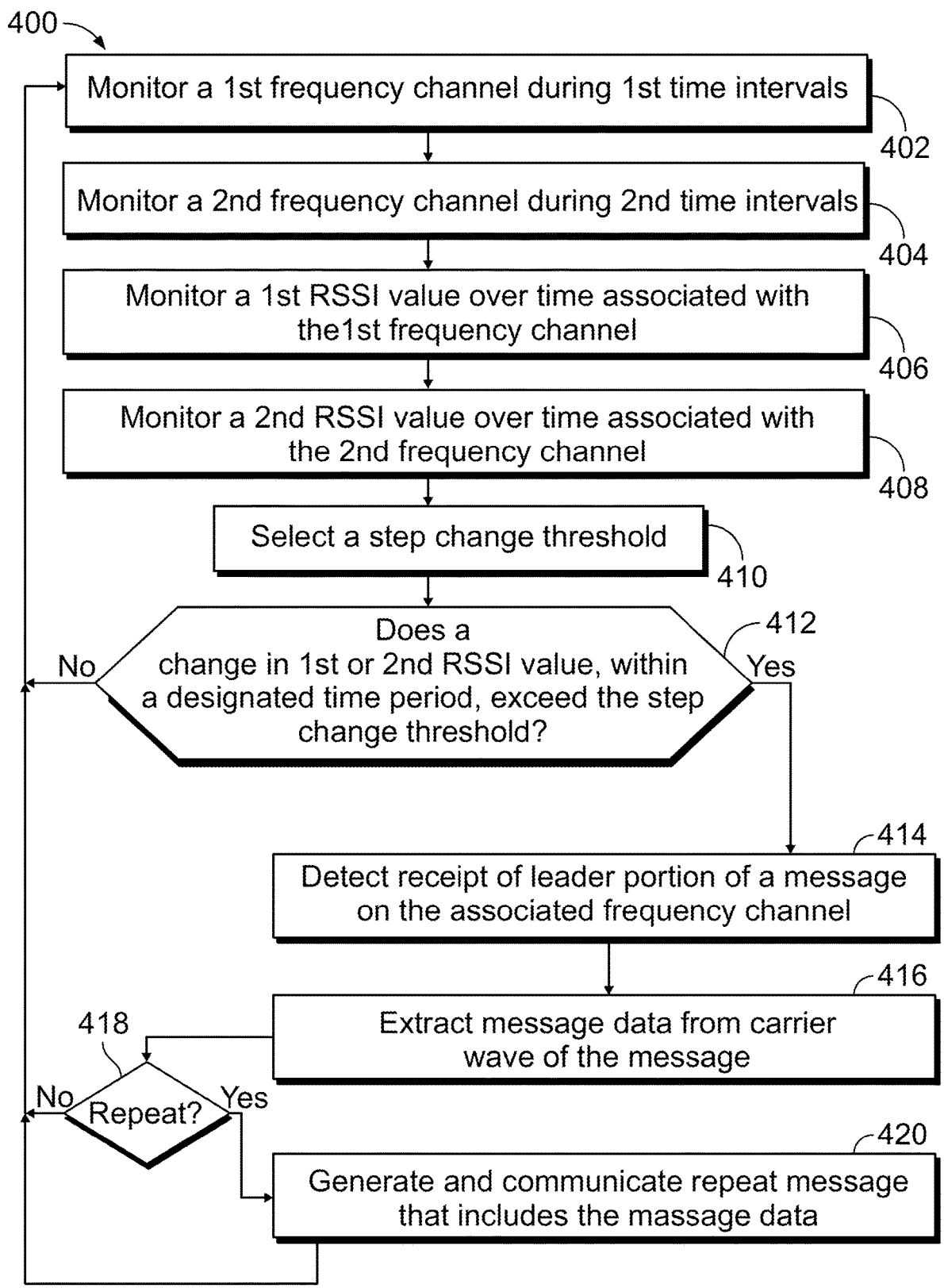
FIG. 4 is a block flow diagram of a method for detecting and handling radio frequency (RF) messages based on dynamic RSSI values according to an embodiment.

FIG. 4 is a method 400 for detecting and handling RF messages based on dynamic RSSI values according to an embodiment. In one example, the method may be performed by the controller of the communication device shown in FIG. 2. The communication device may be a component of one or more of the controller assemblies described in relation to FIG. 1. The method may be performed by the communication device when the communication device is between two communicating devices, a sender device and a receiver device. As used herein the term "between" does not refer to a physical straight pathway from a first communication device to a second communication device. Instead, any communication device that receives a message from a sender device before the message is received by the receiver device may be considered to be between the sender and the receiver devices. The communication device may be onboard a vehicle of a vehicle system. The vehicle system may be a rail vehicle system, a fleet of automobiles, or the like. In an alternative embodiment, the communication device may be disposed at a stationary wayside structure near a route or at another fixed location. The method optionally may include more steps than shown, fewer steps than shown, and/or different steps than shown in FIG. 4.

At step 402, a first frequency channel is monitored during first time intervals. The first frequency channel may be monitored by a tuner circuit of a receiver (or transceiver) of the communication device. The controller may tune the tuner circuit to monitor the first frequency channel alone, or a narrow frequency band that includes the first frequency channel. Each of the first time intervals is less than a duration of a leading portion of an incoming RF message.

At step 404, a second frequency channel is monitored during second time intervals. The second frequency channel may be monitored by the tuner circuit of the receiver (or transceiver) of the communication device. In an embodiment, the controller controls the tuner circuit to switch back and forth between listening for messages on the first frequency channel and the second frequency channel. The first time intervals may alternate with the second time intervals, and the durations of the first and second time intervals may be the same or similar. Optionally, the method may include monitoring a third frequency channel during third time intervals. For example, the tuner circuit may be controlled to monitor the first, second, and third frequency channels in a repeating sequence. The method optionally may include monitoring even more than three frequency channels.

At step 406, a first received signal strength indicator (RSSI) value is measured over time. The first RSSI value is associated with the first frequency channel. For example, the first RSSI value is based on a signal strength of received RF energy on the first frequency channel as detected by the tuner circuit during the first. At step 408, a second RSSI value is measured over time, and the second RSSI value is associated with the second frequency channel. The second RSSI value is based on the signal strength of received RF energy on the second frequency channel. When three or more frequency channels are monitored, the method includes measuring at least a third RSSI value over time, associated with at least the third frequency channel.

At step 410, a step change threshold is selected and/or modified. The step change threshold may be selected by the controller based on one or more dynamic conditions. The dynamic conditions may include a time of day, a time or year, a location of a vehicle on which the communication device is disposed, an ambient signal level, and/or the like. The controller may select the step change threshold to utilize by referring to a database, function, or the like, which establishes a correlation or relationship between various conditions and associated step change threshold values.

At step 412, it is determined whether a change in the first RSSI value or a change in the second RSSI value, within a designated time period, exceeds the step change threshold. The designated time period may encompass more than one time interval. For example, the designated time period for the first RSSI value may encompass at least two first time intervals in which the tuner circuit monitors the first frequency channel. The designated time period for the second RSSI value may encompass at least two second time intervals in which the tuner circuit monitors the second frequency channel. If the first RSSI value or the second RSSI value increases by more than the step change threshold within the respective designated time period, then the question is affirmed and flow proceeds to step 414. If neither of the RSSI changes exceeds the step change threshold within the respective designated time period, then the answer is negative and the flow returns to step 402 to continue monitoring.

At step 414, receipt of a leader portion of a message on the first or second frequency channel is detected. The message is detected on the frequency channel that is associated with the RSSI increase that exceeds the step change threshold. For example, if the change in the first RSSI value exceeds the threshold, then the leader portion of the message is detected along the first frequency channel. The controller then locks onto the first frequency channel by having the tuner circuit continuously monitor the first frequency channel to receive additional portions of the incoming message. The controller does not switch back to monitoring the second frequency channel at the end of the first time interval.

At step 416, message data is extracted from a carrier wave of the incoming message. The message data may be extracted by a detector circuit of the communication device. The message data may include a frame synchronization pattern that is used by the controller to organize and determine frame boundaries. The message data may also include a body of the message, such as a control signal, status information (e.g., sensor data, identification information, etc.), confirmation or acknowledgement of receipt of another message, and inquiry for information, or the like.

At step 418, it is determined whether the communication device should repeat the message that is received. The controller may analyze the message data to determine if several conditions are satisfied. For example, the program instructions implemented by the controller may dictate that the communication device is not to repeat a repeated message. If the message data identifies the message as a repeated message, then the controller would not repeat the message, and flow would return to step 402. Another constraint may be that the controller does not repeat an acknowledgement of a previous message. Another constraint may be that the controller does not repeat a message if the controller is in one or more specific modes. For example, in a first mode, the communication device may be used to send control messages input by an operator onboard the vehicle. The controller may not send repeat messages while operating in the first mode. In an embodiment, if the conditions are satisfied for sending a repeat message, then flow proceeds to step 420.

At step 420, a repeat message is generated and communicated by the communication device. The repeat message may be generated by a transmitter circuit of the communication device. The controller may add an identifier to the repeat message to identify the message as a repeated message. The repeat message is formed to include at least some of the message data from the original message that is received. The repeat message may be communicated at the same frequency channel as the incoming message that is the source of the message data. In the example, above, the repeat message is communicated at the first frequency channel. Then flow returns to step 402 for additional monitoring of the desired frequency channels to detect and handle additional messages.

In one example, the method involves quickly switching radio channels between the frequency channels of interest while measuring the RSSI of each. The RSSI scanning operation may continually re-baseline and monitor for a significant increase in RSSI within a relatively short amount of time. When a "positive step" is observed on the RSSI of one of the channels indicating an increase in RF energy on that channel, this indicates that a message of interest may be on that channel. The controller may suspend the switching and attempt to find the "frame sync" on that channel. When the frame sync is detected, the controller may use the frame sync to receive and interpret the message. Then, the communication device may return to scanning the frequency channels of interest until another step is detected or it is time to retransmit. If the frame sync is not detected or deciphered after a timeout period has expired and/or the RSSI signal decreases, the controller may revert to scanning the frequency channels again without receiving the message.

The communication device and method disclosed herein may allow a single radio receiver to be used for listening to two or more communication pathways more efficiently and/or cost effectively than other alternatives. One alternative is to use two discrete radio devices to monitor two communication pathways, such that each radio receive only listens for one corresponding frequency channel. But, this strategy would require two sets of hardware, which is not energy efficient or cost effective, and would likely require retrofitting to install additional hardware. The communication device and method may be more reliable at detecting messages than other systems and devices because the device and method rely on dynamic RSSI, meaning the change in RSSI over time, which reduces the impact of varying ambient signal levels or noise on the message detection operation.

In an alternative embodiment, a communication device may utilize the dynamic RSSI monitoring scheme disclosed herein without switching a tuner circuit to monitor two or more frequency channels. For example, a communication device may include two tuner circuits within the same housing, and each tuner circuit operates in parallel to monitor a different frequency channel for activity on the channel.

Measuring the RSSI activity on the frequency channels may be useful for additional operations besides message detection. For example, the controller may analyze the RSSI values over time for the frequency channels to for diagnostic purposes. The controller may monitor the signal-to-noise ratio for determining a health of each of the channels. In another example, an unexpected variation in the RSSI value may indicate a fault in the communication device and/or tampering of the communication pathway by a bad actor.

Although several examples are provided herein of the communication device being used to repeat messages communicated between rail vehicles, the communication device and method disclosed herein may be used for vehicle to vehicle communications between autonomous automobiles, trucks, and the like. The embodiments described herein are not limited to vehicle-based devices. For example, the communication device of FIG. 2 may be disposed on a stationary piece of equipment or structure, such as a wayside device, a building, or the like. The stationary communication device may still be used as a repeater device. For example, the communication device may be disposed on a traffic signal, a light post, a street sign, or the like, and may be used to repeat communications communicated between road-based vehicles.

In one or more example embodiments, a communication device is provided that includes at least one tuner circuit, a detector circuit, and a controller including one or more processors. The at least one tuner circuit is configured to monitor at least a first frequency channel and a second frequency channel. The controller is configured to measure a first received signal strength indicator (RSSI) value over time associated with the first frequency channel. The first RSSI value is based on a signal strength of radio frequency (RF) energy received on the first frequency channel measured by the at least one tuner circuit. The controller is configured to measure a second RSSI value over time associated with the second frequency channel. The second RSSI value is based on a signal strength of the RF energy received on the second frequency channel measured by the at least one tuner circuit. The controller is configured to detect receipt of a leader portion of a message on the first frequency channel responsive to determining that a change in the first RSSI value exceeds a step change threshold within a designated period of time, and extract, via the detector circuit, message data from a carrier wave of the message.

Optionally, the at least one tuner circuit may include a single tuner circuit that is configured to measure the signal strength of the RF energy received on the first frequency channel during first time intervals and to measure the signal strength of the RF energy received on the second frequency channel during second time intervals. Optionally, the first time intervals may alternate with the second time intervals such that the single tuner circuit is configured to switch back and forth between monitoring the first frequency channel and the second frequency channel at different times. Optionally, the single tuner circuit may be configured to switch back and forth between monitoring the first frequency channel and the second frequency channel with durations of the first time intervals and the second time intervals being shorter than a duration at which the leader portion of the message is received by an antenna of the communication device.

Optionally, the controller may be configured to dynamically change the step change threshold. Optionally, the controller may be configured to select or modify the step change threshold based on one or more of a time of day, a time of year, a location of a vehicle on which the communication device is disposed, or an ambient signal level of the RF energy received on at least one of the first frequency channel or the second frequency channel. Optionally, the controller may be configured to select the step change threshold to be greater in a first area than a second area, wherein the first area has a greater ambient signal level than the second area.

Optionally, the controller may be configured to select the step change threshold by accessing a database stored in a memory device. The database may associate various step change thresholds with different corresponding conditions.

Optionally, the communication device may be configured to be disposed onboard a vehicle, and the controller may be configured to adjust the step change threshold from a first step change threshold to a second step change threshold while the vehicle moves on a route for a trip.

Optionally, the communication device may include a transmitter circuit, and the controller may be configured to control the transmitter circuit to generate and communicate a repeat message that includes the message data extracted from the carrier wave of the message. Optionally, the controller is configured to communicate the repeat message on one of the first frequency channel or the second frequency channel based on at least one of (i) an intended recipient of the repeat message or (ii) a direction of communication of the repeat message along a length of a vehicle system.

Optionally, the communication device may be a portable device that is configured to be disposed onboard a rail vehicle.

Optionally, the first frequency channel may be used to communicate messages between vehicles of a vehicle system in a rearward direction along a length of the vehicle system, and the second frequency channel may be used to communicate messages between the vehicles of the vehicle system in a forward direction along the length of the vehicle system.

Optionally, responsive to detecting receipt of the leader portion of the message on the first frequency channel, the controller may be configured to continuously monitor the first frequency channel until a remainder of the message is received, a timeout period expires without detecting a frame synchronization pattern in the message, and/or the first RSSI value decreases beyond a drop threshold.

In an embodiment, a method is provided that includes monitoring, via a communication device, at least a first frequency channel and a second frequency channel. The method includes measuring a first received signal strength indicator (RSSI) value over time associated with the first frequency channel. The first RSSI value is based on a signal strength of radio frequency (RF) energy received on the first frequency channel. The method includes measuring a second RSSI value over time associated with the second frequency channel. The second RSSI value is based on a signal strength of RF energy received on the second frequency channel. The method includes detecting receipt of a leader portion of a message on the first frequency channel responsive to determining that a change in the first RSSI value exceeds a step change threshold within a designated period of time, and extracting message data from a carrier wave of the message.

Optionally, the monitoring the first and second frequency channels may include measuring, via a single tuner circuit, the signal strength of the RF energy received on the first frequency channel during first time intervals and the signal strength of the RF energy received on the second frequency channel during second time intervals. Optionally, the method may also include selecting or modifying the step change threshold for the first and second RSSI values based on a time of day, a time of year, a location of a vehicle on which the radio receiver is disposed, and/or an ambient signal level of the RF energy received on the first frequency channel and/or the second frequency channel.

Optionally, the method may also include generating and communicating a repeat message that includes the message data extracted from the carrier wave of the message.

In an embodiment, a communication device is provided that includes a tuner circuit, a detector circuit, and a controller that includes one or more processors. The tuner circuit is configured to independently monitor at least a first frequency channel and a second frequency channel. The controller is configured to control the tuner circuit to measure a signal strength of radio frequency (RF) energy received on the first frequency channel during first time intervals and a signal strength of RF energy received on the second frequency channel during second time intervals. The controller is configured to measure a first received signal strength indicator (RSSI) value over time representing the signal strength of the RF energy received on the first frequency channel, and to measure a second RSSI value over time representing the signal strength of the RF energy received on the second frequency channel. The controller is configured to select or modify a step change threshold for the first and second RSSI values based on a time of day, a time of year, a location of a vehicle on which the communication device is disposed, and/or an ambient signal level of the RF energy received on the first frequency channel and/or the second frequency channel. The controller is configured to detect receipt of a leader portion of a message on the first frequency channel by an antenna of the radio receiver responsive to determining that a change in the first RSSI value exceeds the step change threshold within a designated period of time, and to extract message data from a carrier wave of the message via the detector circuit.

Optionally, the controller may be configured to adjust the step change threshold from a first step change threshold to a second step change threshold while the vehicle moves on a route for a trip.

Optionally, the communication device may also include a transmitter circuit, and the controller may be configured to control the transmitter circuit to generate and communicate a repeat message that includes the message data extracted from the carrier wave of the message.

In some example embodiments, the device performs one or more processes described herein. In some example embodiments, the device performs these processes based on processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the communication system may have a local data collection system deployed that may use machine learning to enable derivation-based learning outcomes. The communication system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the communication system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The maintenance system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A communication device, comprising:
    at least one tuner circuit configured to monitor at least a first frequency channel and a second frequency channel;
    a detector circuit; and
    a controller comprising one or more processors, the controller configured to:
        measure a first received signal strength indicator (RSSI) value over time associated with the first frequency channel, the first RSSI value based on a signal strength of radio frequency (RF) energy received on the first frequency channel measured by the at least one tuner circuit;
        measure a second RSSI value over time associated with the second frequency channel, the second RSSI value based on a signal strength of the RF energy received on the second frequency channel measured by the at least one tuner circuit;
        detect receipt of a leader portion of a message on the first frequency channel responsive to determining that a change in the first RSSI value exceeds a step change threshold within a designated period of time; and
        extract, via the detector circuit, message data from a carrier wave of the message.

2. The communication device of claim 1, wherein the at least one tuner circuit includes a single tuner circuit that is configured to measure the signal strength of the RF energy received on the first frequency channel during first time intervals and to measure the signal strength of the RF energy received on the second frequency channel during second time intervals.

3. The communication device of claim 2, wherein the first time intervals alternate with the second time intervals such that the single tuner circuit is configured to switch back and forth between monitoring the first frequency channel and the second frequency channel at different times.

4. The communication device of claim 2, wherein the single tuner circuit is configured to switch back and forth between monitoring the first frequency channel and the second frequency channel with durations of the first time intervals and the second time intervals being shorter than a duration at which the leader portion of the message is received by an antenna of the communication device.

5. The communication device of claim 1, wherein the controller is configured to dynamically change the step change threshold.

6. The communication device of claim 5, wherein the controller is configured to select or modify the step change threshold based on one or more of a time of day, a time of year, a location of a vehicle on which the communication device is disposed, or an ambient signal level of the RF energy received on at least one of the first frequency channel or the second frequency channel.

7. The communication device of claim 6, wherein the controller is configured to select the step change threshold to be greater in a first area than a second area, wherein the first area has a greater ambient signal level than the second area.

8. The communication device of claim 1, wherein the controller is configured to select the step change threshold by accessing a database stored in a memory device, the database associating various step change thresholds with different corresponding conditions.

9. The communication device of claim 1, wherein the communication device is configured to be disposed onboard a vehicle, and the controller is configured to adjust the step change threshold from a first step change threshold to a second step change threshold while the vehicle moves on a route for a trip.

10. The communication device of claim 1, wherein the communication device further comprises a transmitter circuit, the controller configured to control the transmitter circuit to generate and communicate a repeat message that includes the message data extracted from the carrier wave of the message.

11. The communication device of claim 10, wherein the controller is configured to communicate the repeat message on one of the first frequency channel or the second frequency channel based on at least one of (i) an intended recipient of the repeat message or (ii) a direction of communication of the repeat message along a length of a vehicle system.

12. The communication device of claim 1, wherein the communication device is a portable device that is configured to be disposed onboard a rail vehicle.

13. The communication device of claim 1, wherein responsive to detecting receipt of the leader portion of the message on the first frequency channel, the controller is configured to continuously monitor the first frequency channel until one or more of a remainder of the message is received, a timeout period expires without detecting a frame synchronization pattern in the message, or the first RSSI value decreases beyond a drop threshold.

14. A method, comprising:
monitoring, via a communication device, at least a first frequency channel and a second frequency channel;
measuring a first received signal strength indicator (RSSI) value over time associated with the first frequency channel, the first RSSI value based on a signal strength of radio frequency (RF) energy received on the first frequency channel;
measuring a second RSSI value over time associated with the second frequency channel, the second RSSI value based on a signal strength of RF energy received on the second frequency channel;
detecting receipt of a leader portion of a message on the first frequency channel responsive to determining that a change in the first RSSI value exceeds a step change threshold within a designated period of time; and
extracting message data from a carrier wave of the message.

15. The method of claim 14, wherein monitoring the first and second frequency channels includes measuring, via a single tuner circuit, the signal strength of the RF energy received on the first frequency channel during first time intervals and the signal strength of the RF energy received on the second frequency channel during second time intervals.

16. The method of claim 14, further comprising selecting or modifying the step change threshold for the first and second RSSI values based on one or more of a time of day, a time of year, a location of a vehicle on which the radio receiver is disposed, or an ambient signal level of the RF energy received on at least one of the first frequency channel or the second frequency channel.

17. The method of claim 14, further comprising generating and communicating a repeat message that includes the message data extracted from the carrier wave of the message.

18. A communication device, comprising:
a tuner circuit configured to independently monitor at least a first frequency channel and a second frequency channel;
a detector circuit; and
a controller comprising one or more processors, the controller configured to:
control the tuner circuit to measure a signal strength of radio frequency (RF) energy received on the first frequency channel during first time intervals and a signal strength of RF energy received on the second frequency channel during second time intervals;
measure a first received signal strength indicator (RSSI) value over time representing the signal strength of the RF energy received on the first frequency channel;
measure a second RSSI value over time representing the signal strength of the RF energy received on the second frequency channel;
select or modify a step change threshold for the first and second RSSI values based on one or more of a time of day, a time of year, a location of a vehicle on which the communication device is disposed, or an ambient signal level of the RF energy received on at least one of the first frequency channel or the second frequency channel;
detect receipt of a leader portion of a message on the first frequency channel by an antenna of the radio receiver responsive to determining that a change in the first RSSI value exceeds the step change threshold within a designated period of time; and
extract, via the detector circuit, message data from a carrier wave of the message.

19. The communication device of claim 18, wherein the controller is configured to adjust the step change threshold from a first step change threshold to a second step change threshold while the vehicle moves on a route for a trip.

20. The communication device of claim 18, wherein the communication device further comprises a transmitter circuit, the controller configured to control the transmitter circuit to generate and communicate a repeat message that includes the message data extracted from the carrier wave of the message.

* * * * *